J. ASHCROFT.
Hoisting Machines.
No. 133,289.
Patented Nov. 26, 1872.
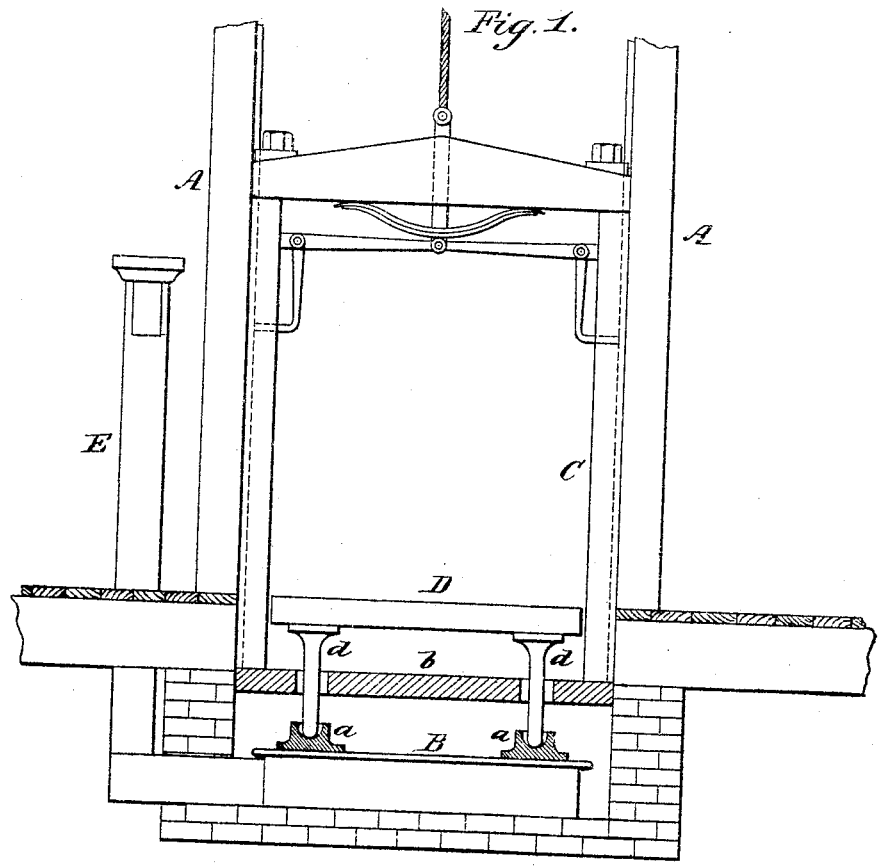
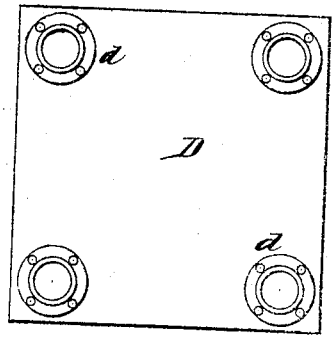
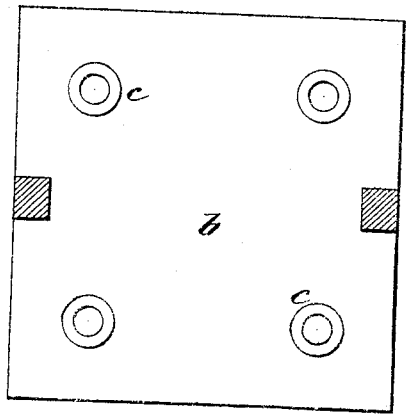
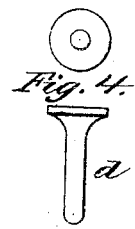
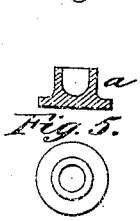
Witnesses.
William Logan
S. B. Roane
Inventor:
John Ashcroft

UNITED STATES PATENT OFFICE.

JOHN ASHCROFT, OF BROOKLYN, NEW YORK, ASSIGNOR TO SARAH JANE ASHCROFT, OF SAME PLACE.

IMPROVEMENT IN HOISTING-MACHINES.

Specification forming part of Letters Patent No. 133,289, dated November 26, 1872.

*To all whom it may concern:*

Be it known that I, JOHN ASHCROFT, of Brooklyn, county of Kings, in the State of New York, have invented an Improved Elevating and Weighing Apparatus, of which the following is a specification:

The nature of this invention consists in combining with the platform of a freight-elevator a table on which the goods to be hoisted or lowered are placed, and weighed upon a stationary scale or portable scale beneath the platform.

In the drawing, Figure 1 is an elevation of my invention; Fig. 2, an under-side view of the table; Fig. 3, a top view of the platform of the elevator; Fig. 4, an elevation and under-side view of the table-legs; and Fig. 5, a top and sectional view of the cups on the scale.

In the drawing, A represents the guide-posts of the elevator C, both constructed in the usual manner. The platform $b$ of this elevator is perforated with several holes, $c$. D is a carrying-table, having several legs, $d$, which pass through the holes $c$ of the platform $b$, and which rest in cups $a$ secured to the top of the stationary scales B.

The operation is as follows: Goods or freight to be weighed, and hoisted or lowered, are at once placed upon the table D, and, its legs resting upon the stationary scales beneath the platform, forming really a part of said scales, they can be at once weighed. When the hoisting-power is applied the platform carries with it the table and its freight. The scale is so adjusted that no deduction for weight of table need be made.

Usually the goods are first weighed on a separate pair of scales before being put on the elevator or after being lowered.

In order to break any sudden jar in letting down the table onto the scale I propose putting springs on the bottom of the table-legs or in the bottom of the cups $a$. Instead of the stationary scales, say on the lowest story, there and on each succeeding upper story a portable scale can be run under the platform of the elevator, say on a temporary removable track across a "hatchway," upon which the table will rest.

Having thus described my invention, what I claim as new, and desire to secure by Letters Patent of the United States, is—

1. In a hoisting and weighing apparatus, the combination and arrangement of the freight-table D and platform $b$, for the purpose shown and described.

2. The combination of the platform $b$, table D, and weighing-scale B, whether the latter be stationary or portable, for the purpose shown and described.

JOHN ASHCROFT.

Witnesses:
S. B. ROANE,
T. C. CONNOLLY.